(12) United States Patent
Halford

(10) Patent No.: US 7,901,166 B2
(45) Date of Patent: Mar. 8, 2011

(54) RECONFIGURABLE WORKPIECE SUPPORT

(75) Inventor: Ben John Halford, Leicestershire (GB)

(73) Assignee: Surface Generation Limited, Leicestershire (GB)

( * ) Notice: Subject to any disclaimer, the term of this patent is extended or adjusted under 35 U.S.C. 154(b) by 976 days.

(21) Appl. No.: 10/596,792

(22) PCT Filed: Dec. 23, 2004

(86) PCT No.: PCT/GB2004/005424
§ 371 (c)(1),
(2), (4) Date: May 5, 2007

(87) PCT Pub. No.: WO2005/061182
PCT Pub. Date: Jul. 7, 2005

(65) Prior Publication Data
US 2009/0020936 A1    Jan. 22, 2009

(30) Foreign Application Priority Data

Dec. 24, 2003 (GB) .................................. 0329979.9

(51) Int. Cl.
*B23C 3/00* (2006.01)
(52) U.S. Cl. .......... 409/132; 409/80; 409/219; 409/199; 269/266; 269/268; 269/304
(58) Field of Classification Search .............. 409/79–80, 409/131–132, 139, 163, 197, 199, 219, 227; 269/266, 268, 303–304
See application file for complete search history.

(56) References Cited

U.S. PATENT DOCUMENTS

| | | | | |
|---|---|---|---|---|
| 1,083,160 A | * | 12/1913 | Villinger ................... | 144/119.1 |
| 1,564,349 A | * | 12/1925 | Hires ......................... | 144/24.05 |
| 2,454,992 A | * | 11/1948 | Coleman .................... | 144/24.05 |
| 4,684,113 A | * | 8/1987 | Douglas et al. ............. | 269/21 |
| 5,375,951 A | * | 12/1994 | Veale ......................... | 409/131 |
| 5,457,868 A | * | 10/1995 | Blaimschein ............... | 29/559 |
| 5,846,464 A | | 12/1998 | Hoffman | |
| 5,988,618 A | | 11/1999 | Meintrup et al. | |
| 6,298,896 B1 | * | 10/2001 | Sherrill et al. ............. | 156/581 |
| 6,386,805 B1 | * | 5/2002 | Suzuki ........................ | 409/163 |
| 6,607,336 B1 | * | 8/2003 | Suzuki ........................ | 409/163 |
| 7,364,147 B2 | * | 4/2008 | Shinozaki ................... | 269/266 |

FOREIGN PATENT DOCUMENTS

WO    WO 02/064308 A    8/2002

OTHER PUBLICATIONS

International Search Report mailed Jun. 20, 2005, in corresponding International Application No. PCT/GB2004/005424, filed Dec. 23, 2004 (4pgs).
Search Report dated Mar. 4, 2004, in corresponding Application No. GB 0329979.9 (1pg).

* cited by examiner

*Primary Examiner* — Daniel W Howell
(74) *Attorney, Agent, or Firm* — Young Law Firm, P.C.

(57) ABSTRACT

A tooling system comprises a plurality of elongate elements each having an upper surface, said elements being arranged in an array to present said upper surfaces for machining by cutting tool means; support means for supporting said elements, each said element being supported on said support means for axial movement between upper and lower positions relative to the other elements in the array thereby to enable adjustment of the vertical position of said element surface; and clamping means for clamping the array of elements in a closed position in which the elements contact one another for enabling the free ends of the elements to be machined to produce a desired surface contour. A method of tooling using such a tooling system comprises storing existing data representing the contour of the surface of each element including the z values of the surface at any given x,y coordinate point relative to a datum; storing new data representing a desired contour for the surface of each element position in the array including the z values of the surface at said any given x,y coordinate point relative to said datum; comparing said new data for a first, selected element position with the existing data for a first element in said selected element position; and adjusting the height of said first element to adjust said z values of said existing data at said any given x,y coordinate point to values at least equal to said z values; of said new data at said any given x,y coordinate point.

56 Claims, 13 Drawing Sheets

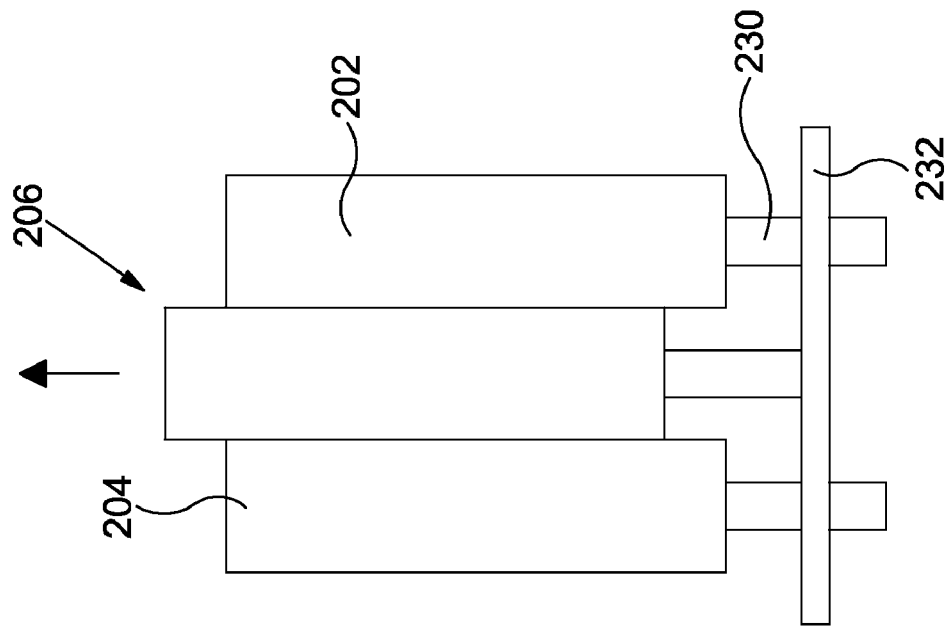
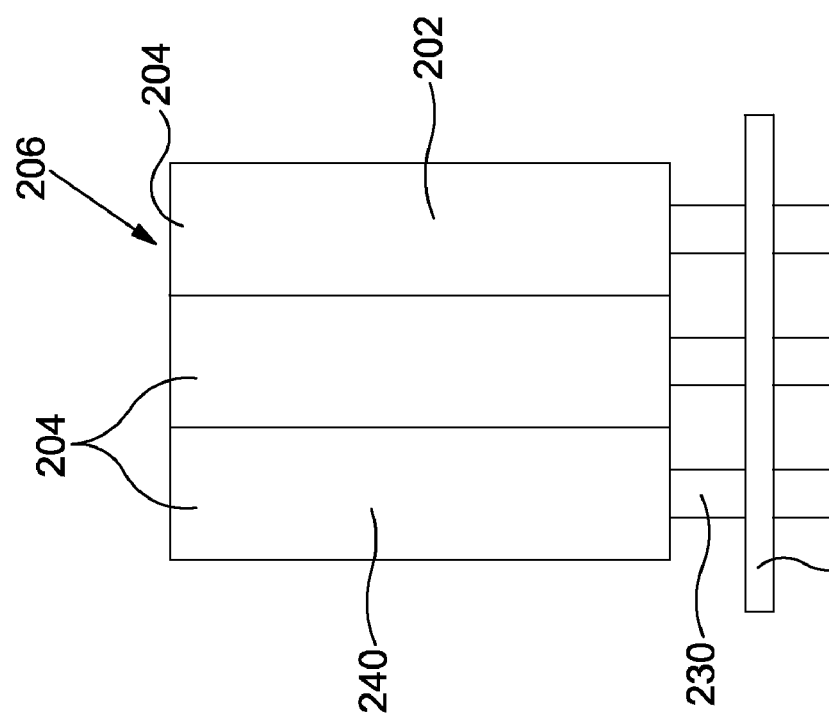

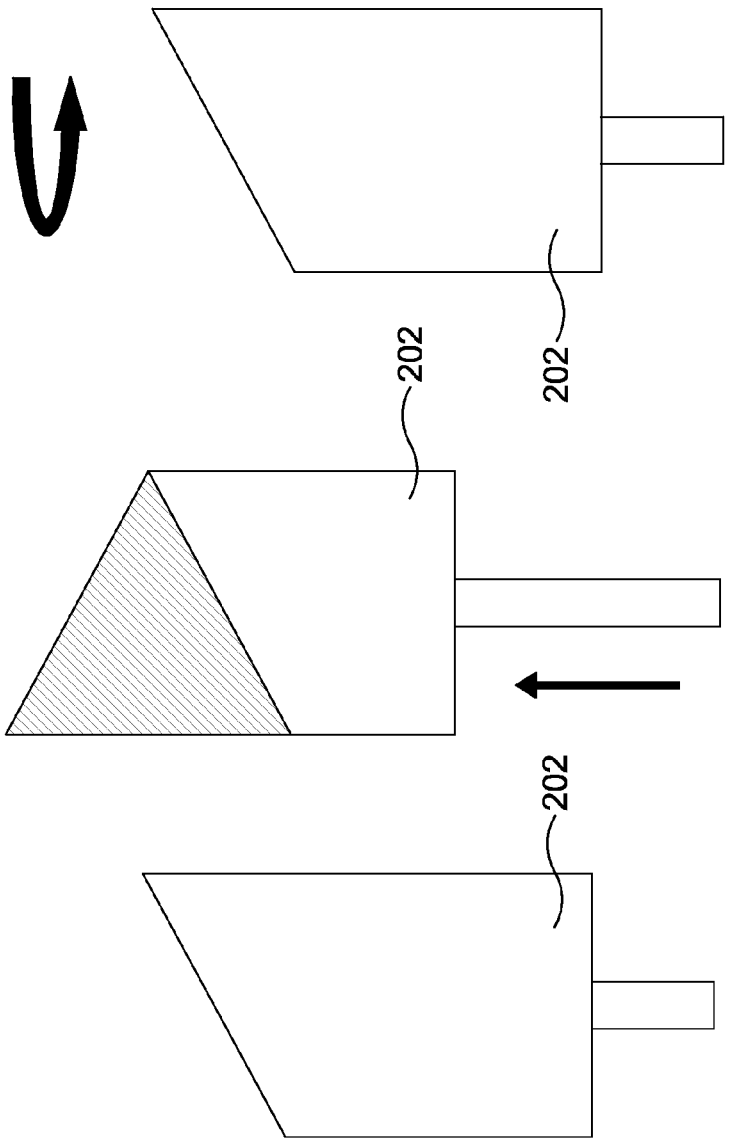

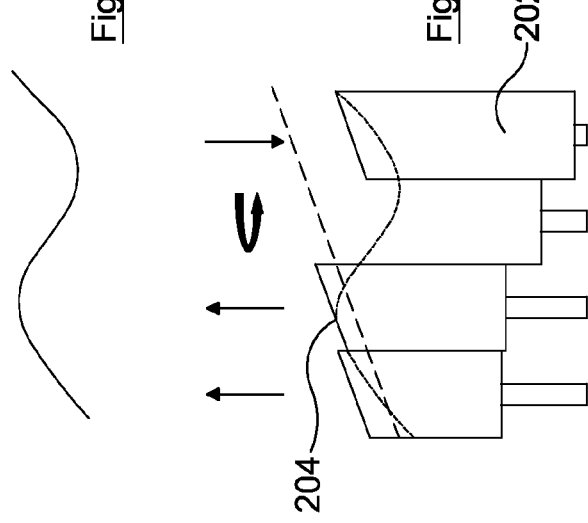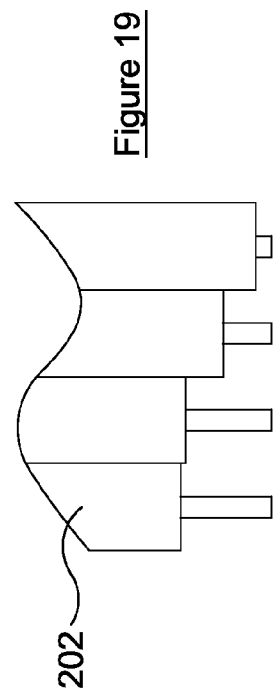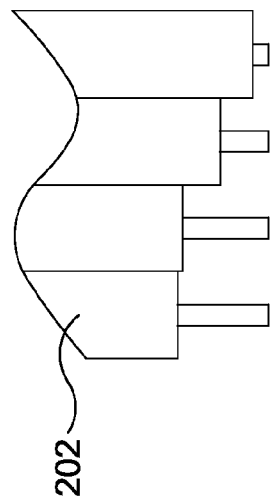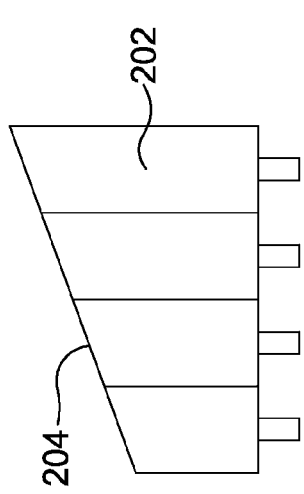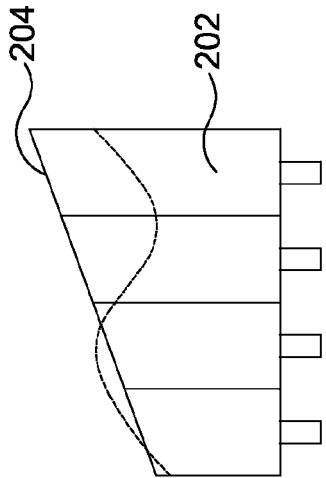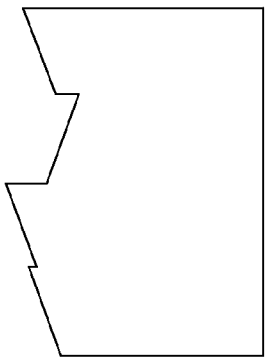

RECONFIGURABLE WORKPIECE SUPPORT

The manufacture of a tool, or pattern, has conventionally involved machining from a billet of material, an additive process such as casting from a mould, sculpting or fettling, or fabrication, for example from sheet metal. For large scale tools, typically required in the aerospace and automotive industries, the length of time in preparing tools by such methods is slow, and is prohibitively expensive. This is due in part to the large size of the billets of material required, which must be committed to the tools in their manufacture, and which may have to be ordered months in advance of their supply.

Furthermore, the amount of skilled labour time and material required in producing a tool conventionally has made it uneconomical to produce a tool for limited volume production, for example in product development, limited batch production and mass customisation.

In order to overcome these problems, reconfigurable modular tools have been developed, typified by that disclosed in U.S. Pat. No. 5,846,464. In the tool disclosed in this patent, an array of vertically adjustable pins are mounted on a drive base, such that the height of each pin above the base can be individually set. A flexible surface, or face sheet, is attached to flexible supports, which are mounted at the ends of the pins. The surface contour of the face sheet can therefore be set to a desired contour by adjusting the individual heights of the pins. The adjustments are controlled automatically through a computer, which is pre-programmed with the desired contour. When the tool is in use, the face sheet surface acts either as a primary tooling surface, or as a secondary tooling surface for producing a pattern or mould, for example, for casting.

Reconfigurable tools of the kind described are suitable for some applications, but for other applications do not have sufficient robustness and/or definition in the tooling surface. The pins which support the flexible face sheet are spaced apart, and do not lie in the plane of the desired surface contour. Therefore the face sheet surface is only a point to point approximation of the desired surface contour. The resolution of the surface is dependent on the density, number and size of pins in the tool array, but as the density of the pins increases, and their size reduces, it becomes increasingly difficult to adjust the positions of the pins.

The combined strength of the pins is also much less than the strength of a solid tool, and therefore the tool is not strong enough for the majority of tooling operations. Furthermore, the aspect ratio, that is, the range of depth in the tooling surface in comparison to its width, is limited by the amount the face sheet can deform.

WO 02/064308 describes a tooling system comprising a plurality of elements arranged in an array, each element being moveable longitudinally relative to the other elements in the array and having a first end. The system has means to adjust the relative longitudinal positions of the elements such that the free ends of the elements define approximately a desired surface contour and means for retaining the elements in their adjusted positions. The first end of each element is provided on a machinable portion removably mounted to a base portion, the arrangement being such that the free ends of the elements can be machined to produce the desired surface contour.

The present invention seeks to provide an improved tooling system and method.

According to a first aspect the invention provides a tooling system comprising: a plurality of elongate elements each having an upper surface, said elements being arranged in an array to present said upper surfaces for machining by cutting tool means; support means for supporting said elements, each said element being supported on said support means for axial movement between upper and lower positions relative to the other elements in the array thereby to enable adjustment of the vertical position of said element surface; and clamping means for clamping the array of elements in a closed position in which the elements contact one another for enabling the free ends of the elements to be machined to produce a desired surface contour.

Preferably, the system further comprises: drive means for moving the elements of the array between said closed position in which the elements contact one another, and an open position in which at least one selected element is spaced from adjacent elements for enabling axial adjustment of said selected element; and adjustment means for adjusting the axial position of each element such that the upper surfaces of the elements define approximately said desired surface contour.

In a preferred form of the invention said support means comprises a plurality of supporting rails arranged parallel with one another; each said support rail supports a plurality of elements; and said support rails are movable laterally relative to one another.

Advantageously, said drive means includes means for gripping said support rail. Each said rail has locating means at each end thereof engageable by said gripping means. Said adjustment means comprises means for engaging and holding an element thereby to enable adjustment of the element position by said adjustment means. Said adjustment means comprises a fork having a head portion, and a plurality of spaced tines depending from the head portion for engaging an element, the tines defining an adjustment area corresponding to the area of an element of the array. The fork comprises a substantially square head portion and a respective tine depending from each corner of said head portion, the tines defining an adjustment area corresponding to the area of an element of the array.

Preferably, the system comprises a tool holder for receiving said cutting tool means, said tool holder being supported for movement in orthogonal x, y, z directions wherein x and y represent orthogonal axes in a horizontal plane and z represents the vertical axis; and drive means for moving said tool holder in said orthogonal directions.

According to a second aspect the invention provides a method of tooling using a tooling system according to the first aspect of the invention, comprising: storing existing data representing the contour of the surface of each element including the z values of the surface at any given x,y coordinate point relative to a datum; storing new data representing a desired contour for the surface of each element position in the array including the z values of the surface at said any given x,y coordinate point relative to said datum; comparing said new data for a first, selected element position with the existing data for a first element in said selected element position; and adjusting the height of said first element to adjust said z values of said existing data at said any given x,y coordinate point to values at least equal to said z values of said new data at said any given x,y coordinate point.

A preferred method comprises repeating the steps of comparing said data and adjusting the height of the element for each element position and element in said array. Said data includes the gradient and rate of change of curvature of the surface.

According to a third aspect the invention provides a method of tooling using a tooling system according to the first aspect of the invention storing existing data representing the existing contour of the surface of each element of at least one existing array including the z values of the surface at any given x,y coordinate point relative to a datum; storing new data representing a desired contour for the surface of each element position in a new array including the z values of the surface at said any given x,y coordinate point relative to said datum; comparing said new data for a first, selected element position with the existing data for at least a first element in the or each said existing array; and in dependence on said comparison: (i) where the existing surface of one of said existing arrays approximates closest to said desired surface, selecting said existing array for machining and adjusting the height of each element of said existing array to adjust said z values of said existing data to values at least equal to said z values of said new data; (ii) where the existing contour of the surface of an existing element of at least one existing array approximates closest to said desired surface, selecting said existing element and moving said existing element to said selected element position in said new array for machining, and adjusting the height of said existing element to adjust said z values of said existing data to values at least equal to said z values of said new data; (iii) where the existing surface of an existing element at said first, selected element position approximates closest to said desired surface, adjusting the height of said existing element to adjust said z values of said existing data to values at least equal to said z values of said new data.

In a preferred embodiment of the method of tooling according to the invention, the method comprises the step of aligning, preferably automatically, the elements within the array relative to each other after they have been adjusted in the z plane so that, when closed, the array has no gaps within it. Where this step is carried out, the clamping force applied by the clamping means is transferred to every element of the array.

The present invention is further described hereinafter, by way of example, with reference to the accompanying drawings in which;

FIG. 7 is a side elevation of several elements of the module of FIG. 2, shown in an array;

FIG. 9 shows the elements of FIG. 7 moved vertically relative to one another;

FIGS. 10 to 13 illustrate the adjustment of one element of the module of FIG. 2;

FIGS. 14 to 19 illustrate the method of producing a new contour surface from an existing surface;

Figure 1:
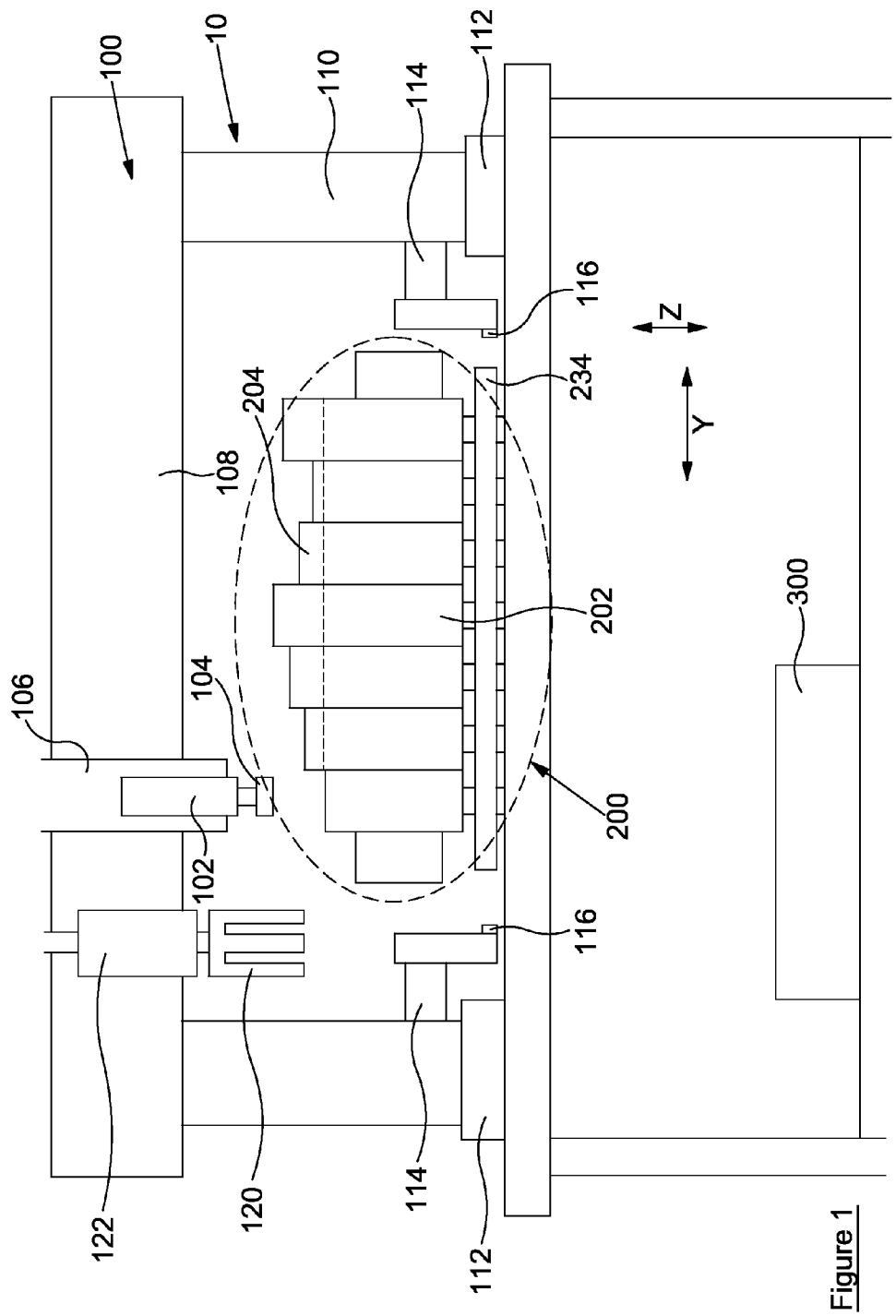
FIG. 1 shows a diagrammatic side elevation of a preferred form of tooling system according to the present invention.
Figure 4:
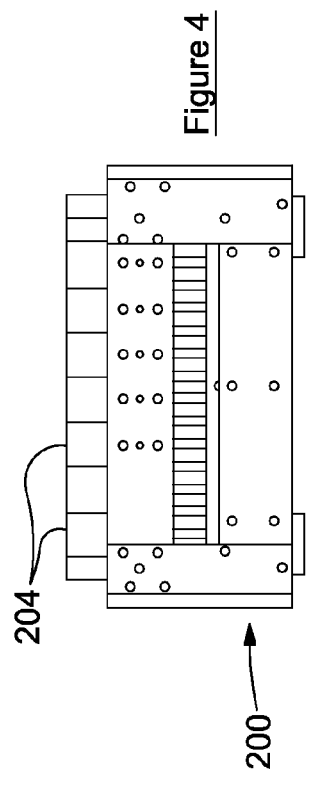
FIG. 4 is a side elevation in the direction of arrow B of FIG. 2.

FIG. 1 shows a preferred form of tooling system 10 having a CNC cutting or milling machine 100 and a module 200. The milling machine 100 has a tool holder 102 which carries a cutting tool 104 such as a milling tool for milling the surface of the module 200. The tool holder 102 is mounted for movement in the z axis on a carrier 106 which is in turn mounted for movement along a cross member 108 in the y axis. The cross member 108 is mounted by pillars 110 for movement in the x axis on parallel rails 112. The arrangement is such that the milling tool can be moved to any point in the x-y-z axes (working envelope) to mill a preselected surface on the module 200.

Referring to FIGS. 2 to 5 these show the module 200 which is sometimes referred to as a reconfigurable tool. For a more detailed and full description of this module and its operation reference is made to WO 02/64308, the contents of which are incorporated herein by reference.

Figure 2:
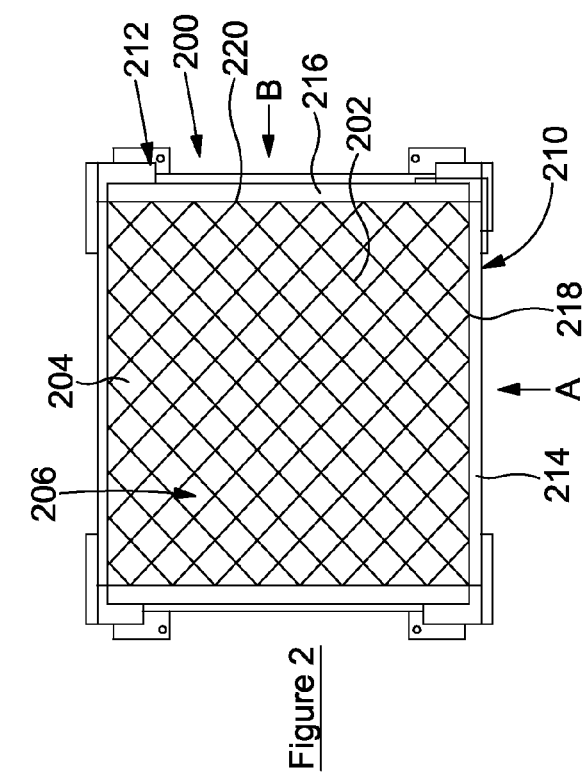
FIG. 2 is a plan view of a module for the system of FIG. 1.

The module 200 has a plurality of elements 202 arranged in a closed position, that is, with the sides of adjacent elements 202 in contact with one another. An upper end 204 of each element 202 forms part of a tooling surface 206. As shown, the elements 202 are arranged in an array 208 which is preferably a diamond array with clamping members 210, 212 providing additional lateral support to secure the elements 202 of the array 208 relative to one another, when the module 200 is being machined and is in use. As can be seen in FIG. 2 each of the clamping members includes a jaw 214, 216 which has a plurality of vertical slots or teeth 218, 220 to receive the corners of associated elements 202 and facilitate clamping.

Figure 6:
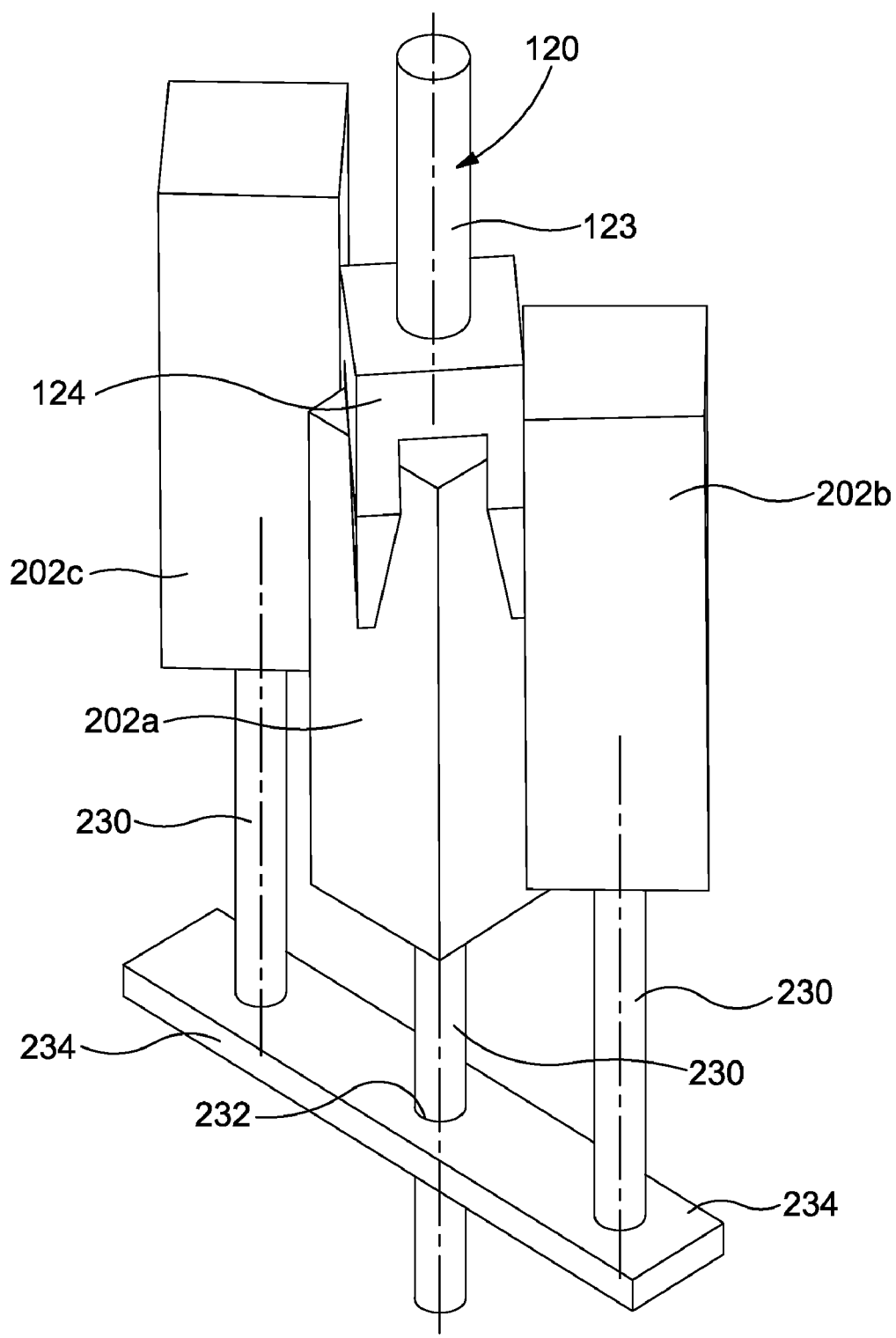
FIG. 6 is a perspective view of a detail of the system of FIG. 1.

Each element 202 is rigidly supported on a coaxial rod 230 extending downwardly from the lower end of the element 202 (FIGS. 6 and 7). Each rod 230 carries an external thread and engages through a screw-threaded fixed bore 232 in a supporting rail 234 such that when the rod 230 is rotatably driven it moves axially relative to the rail 234 to move the element 202 up and down along its vertical axis. The rod 230 is secured to the element 202 such that the element 202 rotates with the rod 230.

Figure 5:
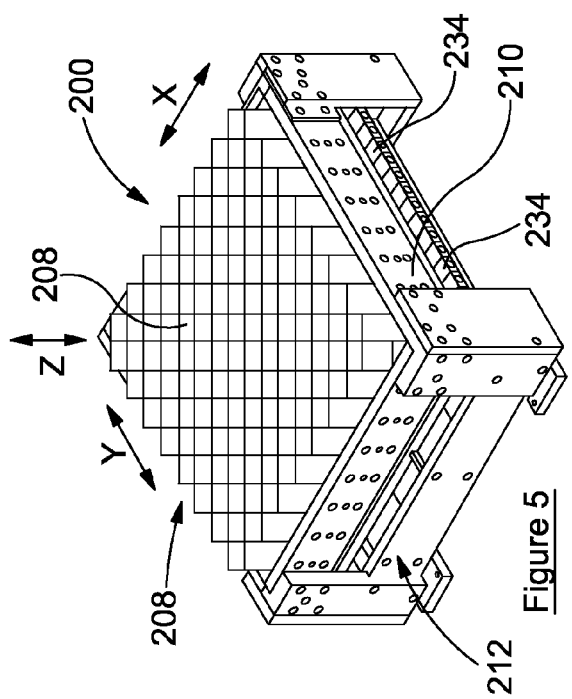
FIG. 5 is a perspective view of the module of FIG. 2.
Figure 3:
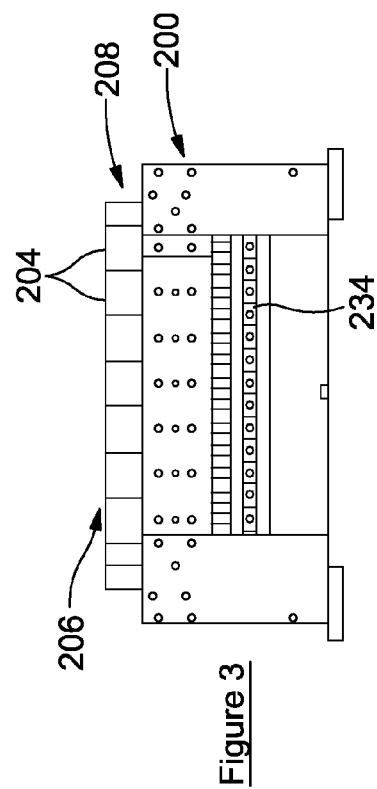
FIG. 3 is a side elevation in the direction of arrow A of FIG. 2.

As can be seen in FIGS. 5 and 6, each diagonal row of elements 202 is supported by a respective supporting rail 234. When the elements 202 are in a closed attitude the supporting rails 234 run parallel with the diagonals of the elements 202, providing the diamond array.

Each pillar 110 of the milling machine 100 carries a respective side action clamping member 114. The clamping members 114 are supported on the pillar 110 so as to be movable in unison towards and away from the module 200 under the action of suitable drive means. Each clamping member 114 carries a clamp 116 with suitable locating means for engaging with cooperating locating means at the adjacent end of a supporting rail 234. The locating means may be as simple as a recess in the end of each rail 234 and a dimple on the clamp 116.

The clamps 116 can be moved towards and away from an adjacent supporting rail 234 in unison to grip the selected supporting rail 234 for movement of the rail in the x axis.

The milling machine 100 also has an adjustment tool 120 which is mounted on a carrier 122 on the cross member 108. The carrier is movable along the cross member 108 to move the tool 120 in the x-y plane and the tool 120 is mounted on the carrier so as to be movable vertically in the z axis. The carrier and tool can be driven by any suitable means such as electric drive motors. The tool has a longitudinal body 123 which carries or is formed with four tines or projections 124 at its lower end extending axially of the tool. The tines are arranged such that they engage around an element 202 with each tine engaging against a flat side surface of the element (FIG. 6).

The tool 120 is mounted for rotation about its longitudinal axis and the body 123 is connected to a drive means such as a drive motor so as to be rotationally drivable to turn the tool and thus the tines 124 about the z axis.

Figure 8A:
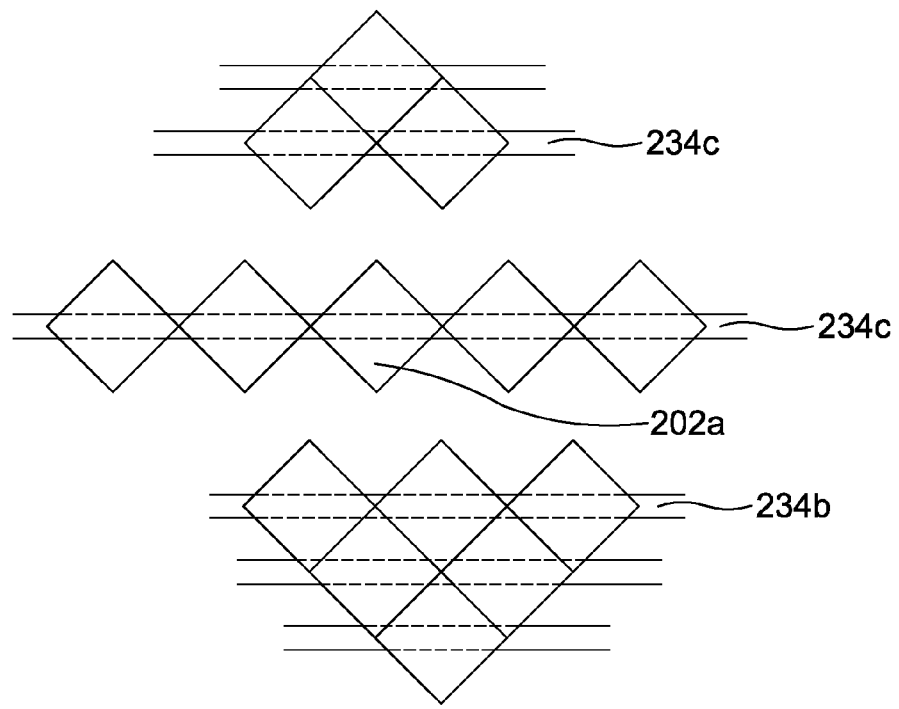
FIG. 8a is a plan view of an array of elements illustrating the opening out of the module of FIG. 2 for adjustment.

If, for example, it is desired to adjust the vertical position of an element 202a (the target element) in the array 204, the diagonal row containing the element must first be separated from the adjacent diagonal rows of elements. To effect this, the pillars 110 are moved to bring the clamps 116 in line with the supporting rail 234c which is adjacent one side of the target supporting rail 234a carrying the target element 202a (FIG. 8a). The clamps 116 are then driven inwardly towards one another to cause the locating means on the clamps 116 to engage the cooperating locating members on the supporting rail 234c. Once engaged, the pillars 110 are moved to move the supporting rail 234c and adjacent rails in the same direction.

The clamps 116 are then disengaged from the rail 234c and the pillars 110 are moved to bring them adjacent the supporting rail 234a where the clamps 116 are actuated to engage the target rail 234a. The pillars 110 are then again moved to move the supporting rail 234a. The diagonal line of elements including target element 202a supported by rail 234a are thus spaced from the adjacent diagonal lines of elements 202, providing an "open" array.

If the array 204 is a large array it may be that in moving supporting rail 234c the total weight of supporting rails to be moved by the pillars 110 and clamps 116 is greater than the system can cope with. For example, if the system is rated to move a maximum weight of ten supporting rails and the supporting rail 234c is the fifteenth supporting rail then the pillars 110 and clamps 116 are controlled firstly to engage the tenth supporting rail from the end of the array and move the first ten supporting rails in the same direction. The clamps 116 are then disengaged from the tenth supporting rail and are moved to engage the fifteenth supporting rail 234c which is also moved in the same direction until the eleventh supporting rail of the array abuts the tenth supporting rail. Effectively, the clamps 116 can "step" through the array until the supporting rail 234c is reached, wherever the rail is positioned within the array.

Figure 8B:
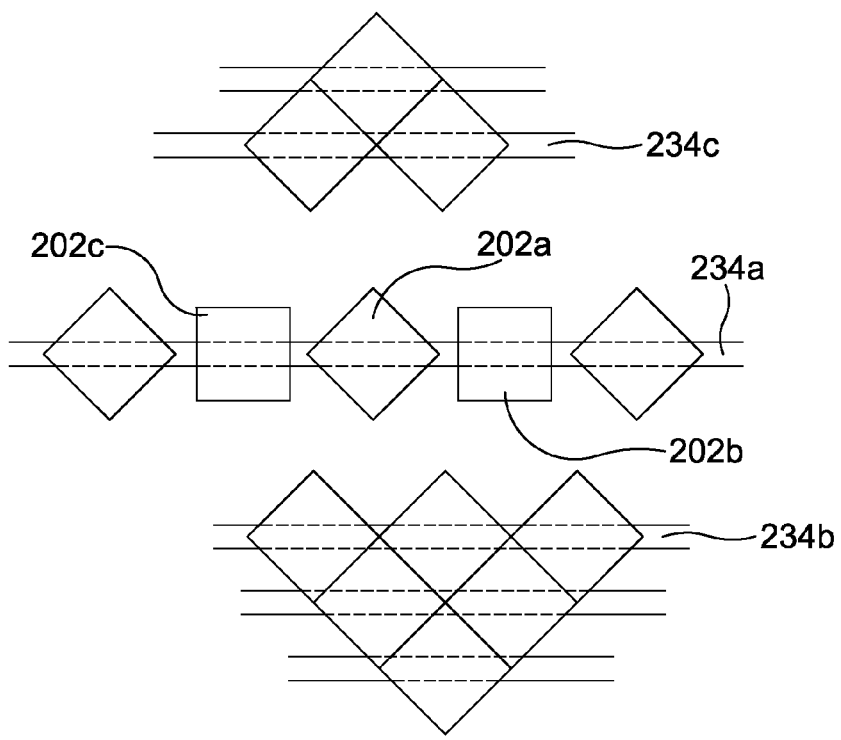
FIG. 8b is a plan view of the elements of FIG. 8a with the rotational position of elements adjusted.

The elements 202b, 202c which are adjacent to element 202a need to be rotated through a small angle, typically 45 degrees into the positions shown in FIG. 8b, to allow free rotation of element 202a. To this end, the adjustment tool 120 is moved in the x-y plane to bring the tool vertically above one element 202b. The tool 120 is rotated, if necessary, to bring the tines into alignment with the faces of the element 202b and the tool is then lowered to engage the element. The drive motor for the tool 120 is activated to rotate the tool and thus the element through an angle of 45.degree. into the position shown in FIG. 8b. This is repeated for element 202c.

Once the two elements 202b, 202c are rotated into the positions shown in FIG. 8b the tool engages element 202a and is rotated to raise or lower the element to the desired height. The prior adjustment of elements 202b, 202c allows element 202a to be fully rotated to enable its vertical position to be adjusted without fouling any of the adjacent elements.

This process is repeated for each element on the rail 234a that requires its vertical position to be adjusted. Once all of the elements on the rail 234a have been positioned vertically, the process is repeated for elements on any other rails 234 that require vertical adjustment. Once the elements have been adjusted and the elements of each row diagonally aligned the array 204 is closed using the clamps 116 to bring the rails 234 together and the array is clamped once again by the clamping members 210, 212, and the tooling surface 206 is ready for machining.

Figure 20:
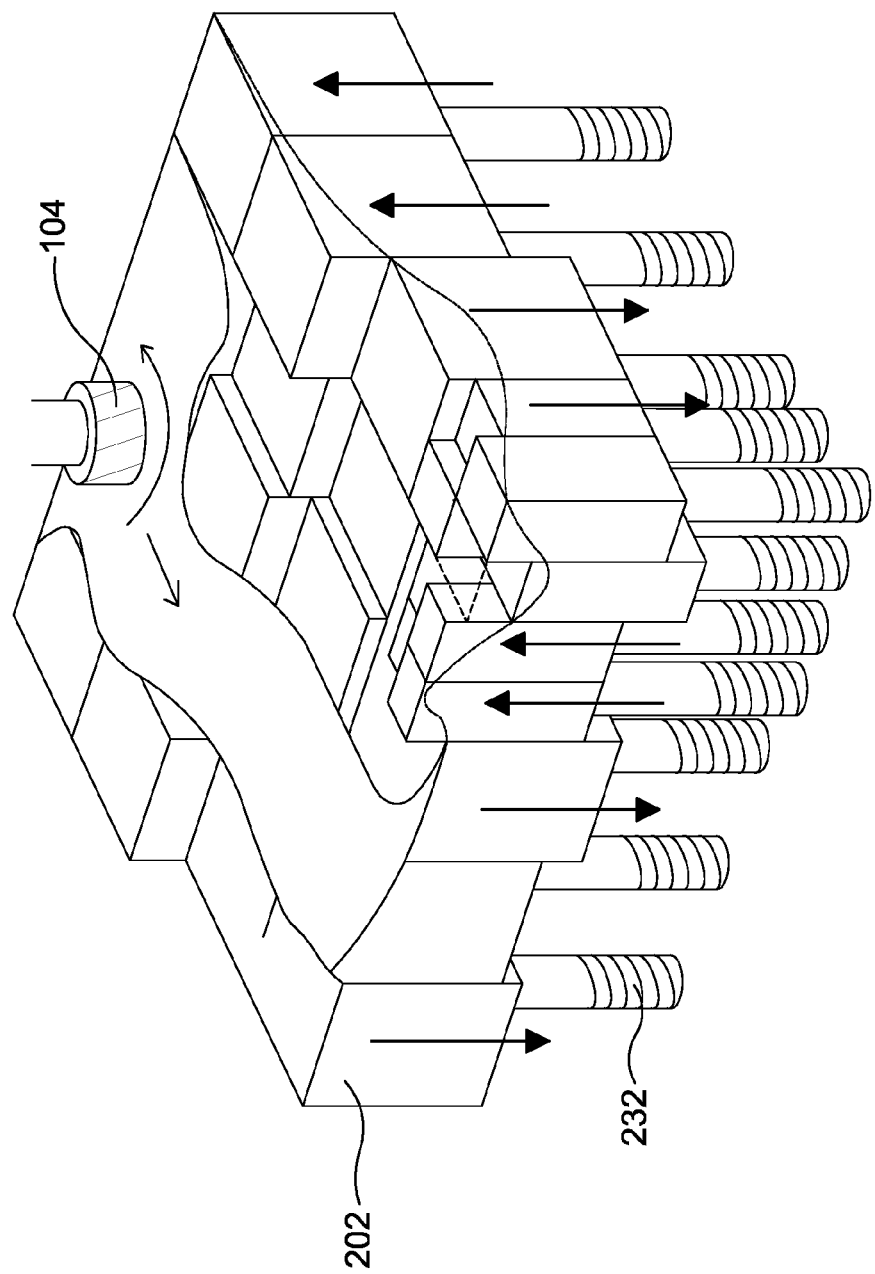
FIG. 20 is a perspective view of a portion of the module of FIG. 2 in which the surface contour of the module is being cut to a desired shape with a milling cutter.

When the elements have been positioned vertically, the tooling surface 206 is machined by the milling cutter 104, as seen in FIG. 20. A minimum amount of machining is required, because the elements 202 have already been positioned before machining, as described above. Only a finishing cut should be required, which means that typically, less than 5% of each element is sacrificed in machining.

Figure 22:
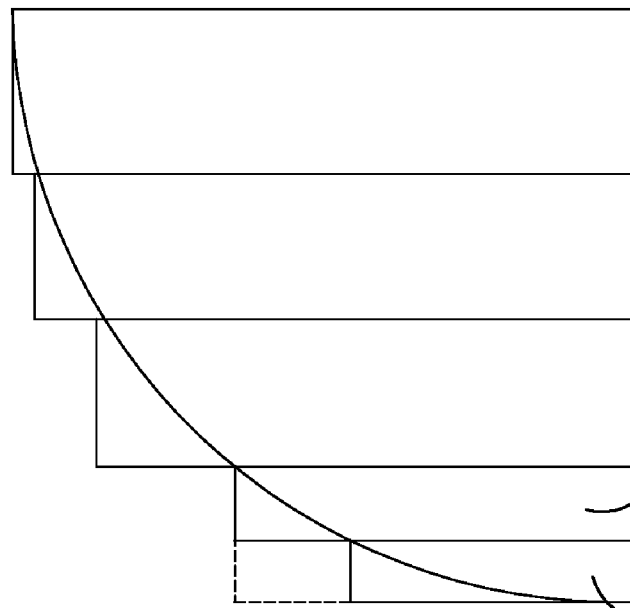
FIGS. 21 and 22 are side elevations of elements of the module of FIG. 2 illustrating apart of one method of machining large volumes.
Figure 21:
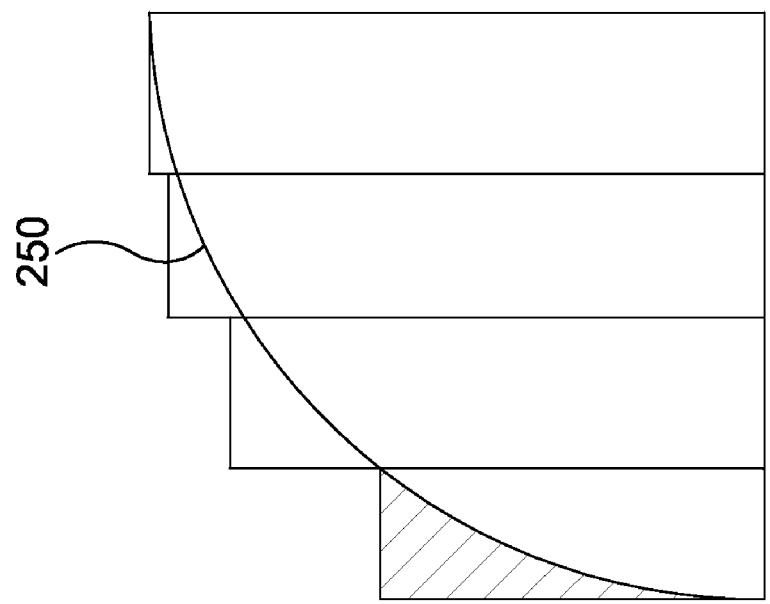

Referring to FIG. 21, this shows an array of elements 202 in side elevation with an intended machining line 250. As can be seen from FIG. 21, this requires a significant amount of material to be machined from the left hand element 202. This would increase the machining time and cost and result in a considerable waste of material. To avoid this, where the microprocessor identifies that the amount of material to be machined from an element is greater than a preset amount, it replaces the single element 202 by four smaller elements 252. These elements 252 ideally have cross sections one quarter that of the original element but this may be varied. Smaller elements 252 of varying heights may be available and are selected in order to ensure that a minimum amount of material needs to be machined, as illustrated in FIG. 22.

In order to allow for the possibility of an element 202 being replaced by smaller elements, additional supporting rails 234 are provided, each with screw-threaded bores 232 to accommodate the additional smaller elements 252 when required.

The smaller elements 252 are positioned and their heights adjusted in the manner described above for the larger elements 202.

When the tooling surface 206 is machined, it is preferred that the elements 202 are machined in the assembled module 200. However, if this is not possible due to the large size of the module 200, then the elements 202 can be removed from the module 200 and machined independently.

The elements 202 can be made from a wide range of materials, for example plastics, metals, wood and alloys, and the choice of material depends on the environment of application of the module. However, the choice of material is limited by the requirement that the tooling surface 206 be machined. In some applications the tooling surface can be protected, for example, by the application of a resin, membrane, or plated veneer over the tooling surface 206.

It is intended that the size of each module 200 is unlimited, and that the size of the module 200 can be changed by adding or removing elements 202 from the array 208. For a large product, such as an aircraft wing, the elements may for example be 500 mm square with a vertical movement of 1 m. For a small product, such as a mobile telephone, the elements may for example be 5 mm square with a vertical movement of 300 mm. The module 200 is intended for use in a range of applications, both primary and secondary, including for example vacuum forming, composite lay ups, press tooling, injection moulding and die casting.

Figure 23:
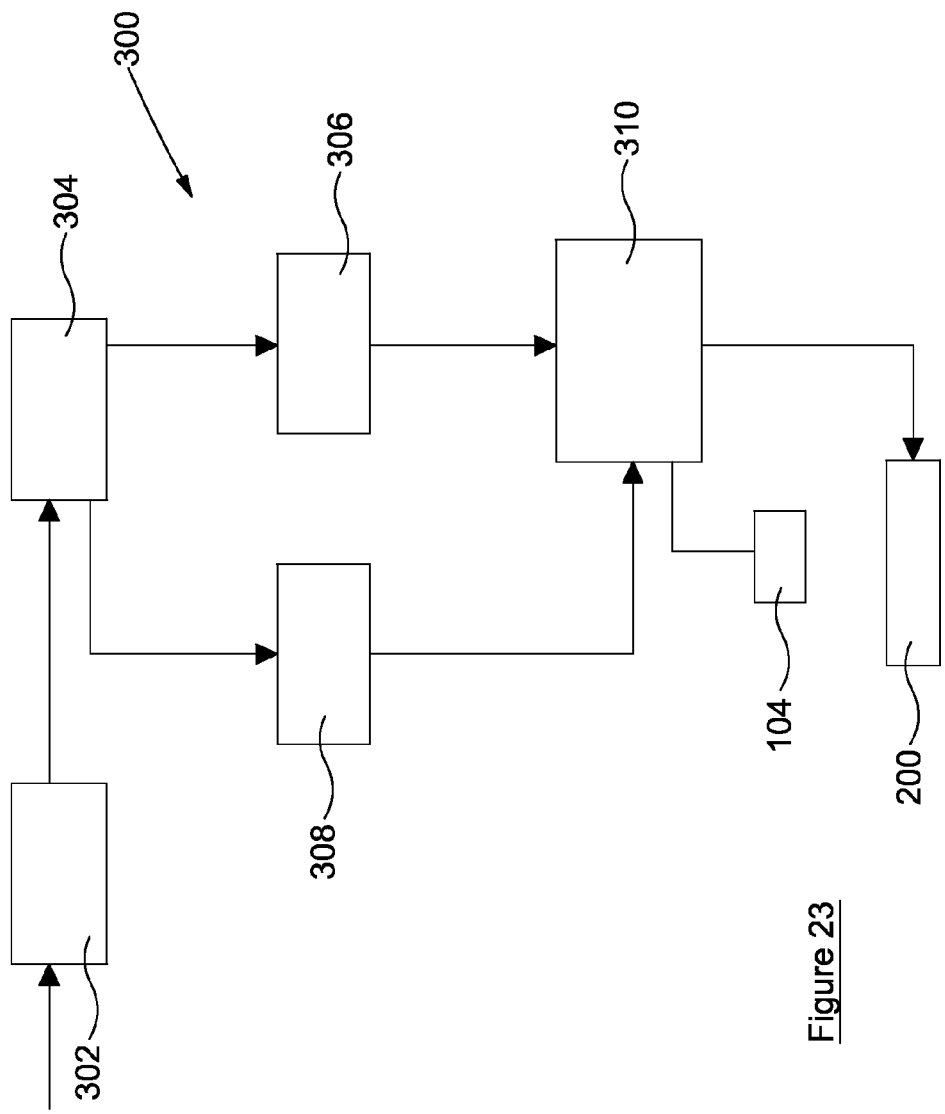
FIG. 23 is a block schematic diagram of a control system for the tooling system of FIG. 1 and FIGS. 24a, 24b and 24c illustrate steps in correcting misalignment of the array elements.

Referring now to FIG. 23 this shows a block schematic diagram of the control system 300 for the tooling system of FIG. 1. The control system 300 has a store 302 into which a surface CAD file is loaded. This can be a file supplied by a third party but represents the contour of the surface to be machined using the module of FIGS. 2 to 5. A microprocessor 304 takes the CAD file and converts it into a file having "segments" or "elements" each of which corresponds to a respective element of the module 200. the file is fed to a further memory 306. The information includes the height or z value difference between the minimum height of the element surface and the minimum height of the desired surface at any given x,y coordinate point for the element surface, and also information on the angle and direction through which the element 202 needs to be rotated to bring the element to a vertical position at which the minimum height of the element surface at each given x,y coordinate point is at least equal to or greater than the desired surface minimum height for the element 202 at that coordinate. Typically, this is a .txt file.

The microprocessor 304 also creates typically a .stl file which is stored in a further store 308 representing the topography of the required surface. This is similar to the .txt file in that it is formed by discrete elements providing information on the contour of the desired surface for each of the module elements 202. The information stored in the memories 306 and 308 is then used by the CNC milling machine 100. The machine 100 using the information from the memories 306, 308, adjusts the height of each element 202 in turn and then machines the contour of the upper surface of the element array 204.

When the module 200 is a new module i.e. one that has not previously been machined to a particular contour and where the surface 206 is flat the microprocessor will start at a first element and, knowing the z value for the upper surface 204 of the element 202 will control the machine 100 to open the array 208. The adjustment tool 120 is then brought into position and is used to turn each of the two adjacent elements 202 through an angle of typically 45 degrees. The adjustment tool 120 is then moved into engagement with the selected element 202 and is rotatably driven to raise or lower the selected element 202 such that the upper surface 206 of the element is raised to the value of the highest z value for the desired surface area at that element. In practice, the microprocessor compares the desired maximum z value with the actual z value of the selected element 202 to determine if the selected element needs raising or lowering and causes the adjustment tool 120 to be rotated clockwise or anti-clockwise to move the element in the desired direction. The microprocessor 304 can also provide an offset of typically 5 mm such that the upper surface of the element 202 is raised above the maximum desired z value by 5 mm. This is to ensure proper machining of the whole surface and the offset can be varied from zero if desired.

If the microprocessor controlled the main tool 104 to machine the desired surface using only the files stored in memories 306 and 308 there would be occasions where the milling tool would be moved in a machining operation through air. Therefore, in order to avoid this when the element 202 is raised or lowered to the desired position, after height adjustment of the element the surface information for the actual surface 204 of the element 202 i.e. the z values for various x,y co-ordinates within the element surface, are stored in a separate memory to create a new actual surface file which may include the exposed vertical faces of the elements 202 or information giving the step changes within the surface at an element face.

The microprocessor then uses the new surface file and the files stored in memories 306 and 308 to control the milling tool 104 to ensure that the machining process is effected efficiently and avoids the above-mentioned problems.

This is illustrated in FIGS. 14 to 19 where FIG. 14 shows an existing array of elements 202. FIG. 15 is a side elevation of the desired surface contour for the elements of FIG. 14 and FIG. 16 shows this desired surface contour superimposed on the elements of FIG. 14.

FIG. 17 shows the elements of FIG. 14 having been adjusted to bring the surfaces 204 of the elements as close to the desired surface contour as practical.

FIG. 18 is a representation of the actual, new surface of the elements 202 which is stored in a further memory by the microprocessor as the actual surface contour file and FIG. 19 shows the newly machined surface.

The above description referred to a new module having a flat upper surface 206 for the elements 202. However, it is more usual for the module being machined to have a previously machined upper surface 206.

In such a case, the microprocessor has both the existing surface profile stored in memory as well as the desired surface contour derived from the relevant CAD file. The microprocessor 304 thus stores the position and contour of the surface 204 of each element 202 of the previously machined module. When the new CAD file is loaded into memory 302 and converted by the microprocessor 304 into the files stored in memories 306, 308, the microprocessor selects the first element 202 of the module to be machined (the selected element) and looks in its memory for an element 202 (the replacement element) of the module 200 having a contour closest to the desired contour for the surface of the selected element 202. Once this replacement element 202 is found, the machine 100 is then controlled by the microprocessor 304 to remove the selected element and replace it with the replacement element. This is effected by the adjustment tool which is used to unscrew the selected element, pick it up and park it in a holder or store and then unscrew the replacement element and locate it in the position vacated by the selected element. The selected element can be retained in the holder or moved to the vacated position of the replacement element. Whichever is the case, the microprocessor 304 stores the position of the selected element for comparison of the surface contour with further desired surface contours. This is repeated for each successive element in the module, the result being that a minimum amount of machining is required to convert the existing contour into the newly desired contour. In some instances the desired surface contour of an element may be the reverse of an existing element, for example as shown in FIGS. 10 to 13. FIG. 10 shows the surface contour 204 of an existing element 202 whilst FIG. 11 shows the desired surface contour. It can be seen that the contours are very similar except for the fact that the contour of FIG. 10 is the reverse slope of the contour of FIG. 11. To achieve the contour of FIG. 11 from the element 202 of FIG. 10 would require the machining of the amount of material from the element of FIG. 10 as shown in FIG. 12. However, the amount of material to be removed can be significantly reduced in this case by rotating the existing element of FIG. 10 through 180° as shown in FIG. 13.

Although we refer above to a reversal of the element through 180 degrees, it may also be that rotating the element through 90 degrees or 270 degrees would provide the best surface contour for minimum machining.

The above applies to elements of rectangular or square cross section. Where the elements are other cross sectional shapes the rotational angle will of course vary accordingly.

The system can be operated in three modes, manual, semi-automatic and automatic (as described above).

In the manual mode the microprocessor 304 will indicate, on a display which of the elements 202 require height adjustment. The operator will then adjust the height of those pins prior to machining. The operator will also manually effect the opening and closing of the element array in order to allow manual adjustment of selected elements.

In the semi-automatic operating mode the shuttling of elements 202 between their open and closed positions and the height adjustment of the elements will be effected by the CNC machine 210 independence on the information in the memories 306, 308.

Figure 24A:
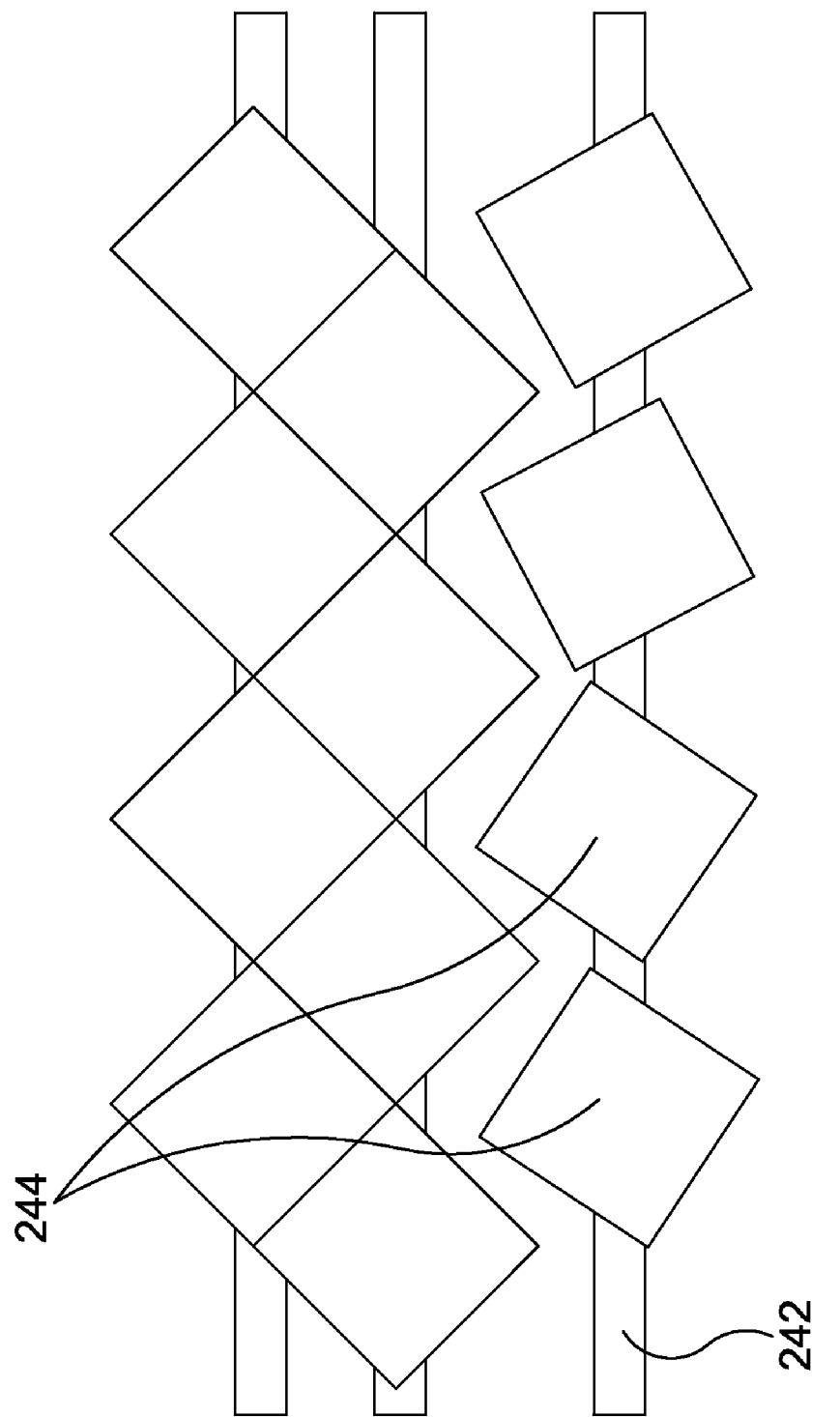
Figure 24B:
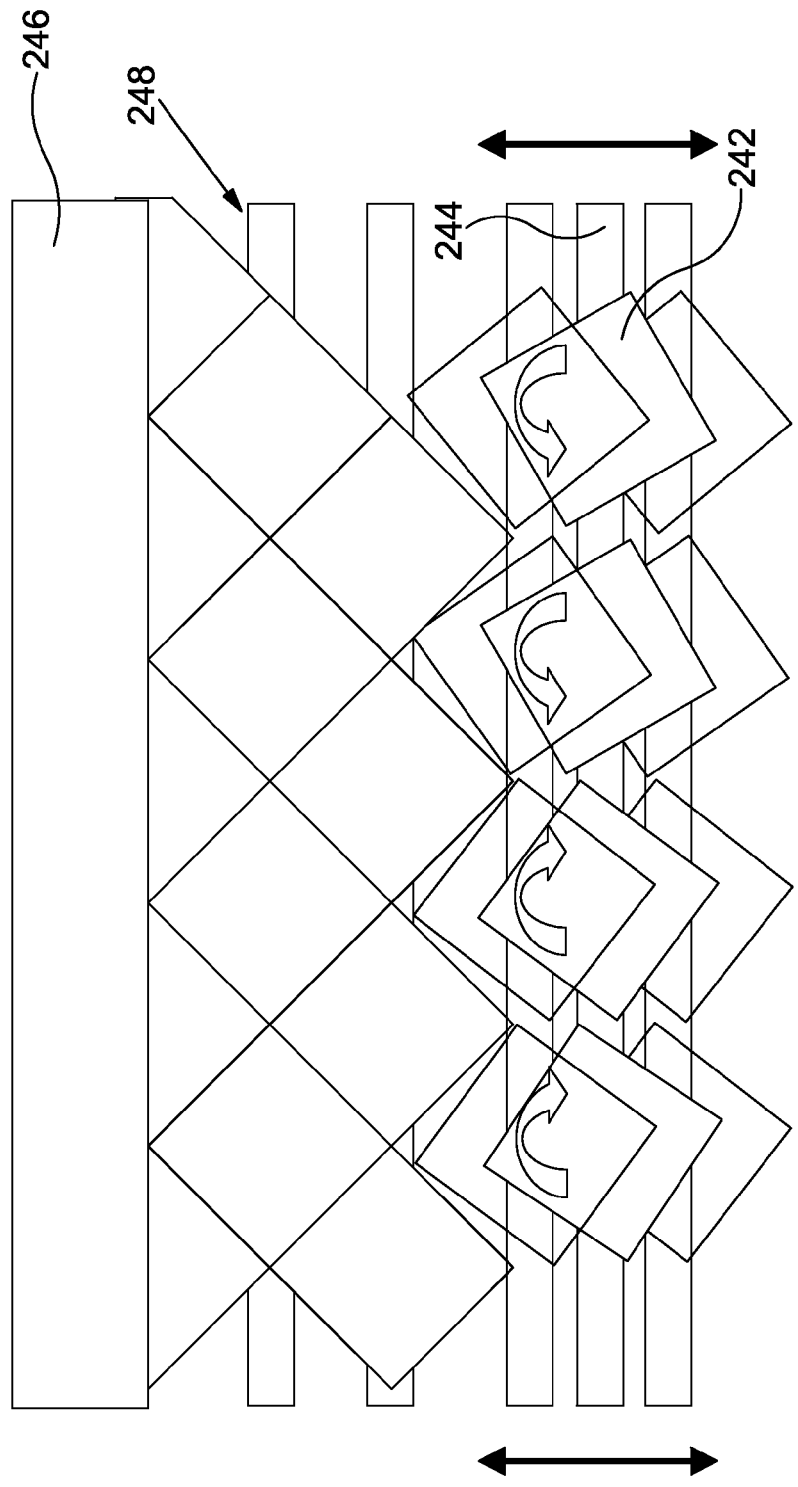
Figure 24C:
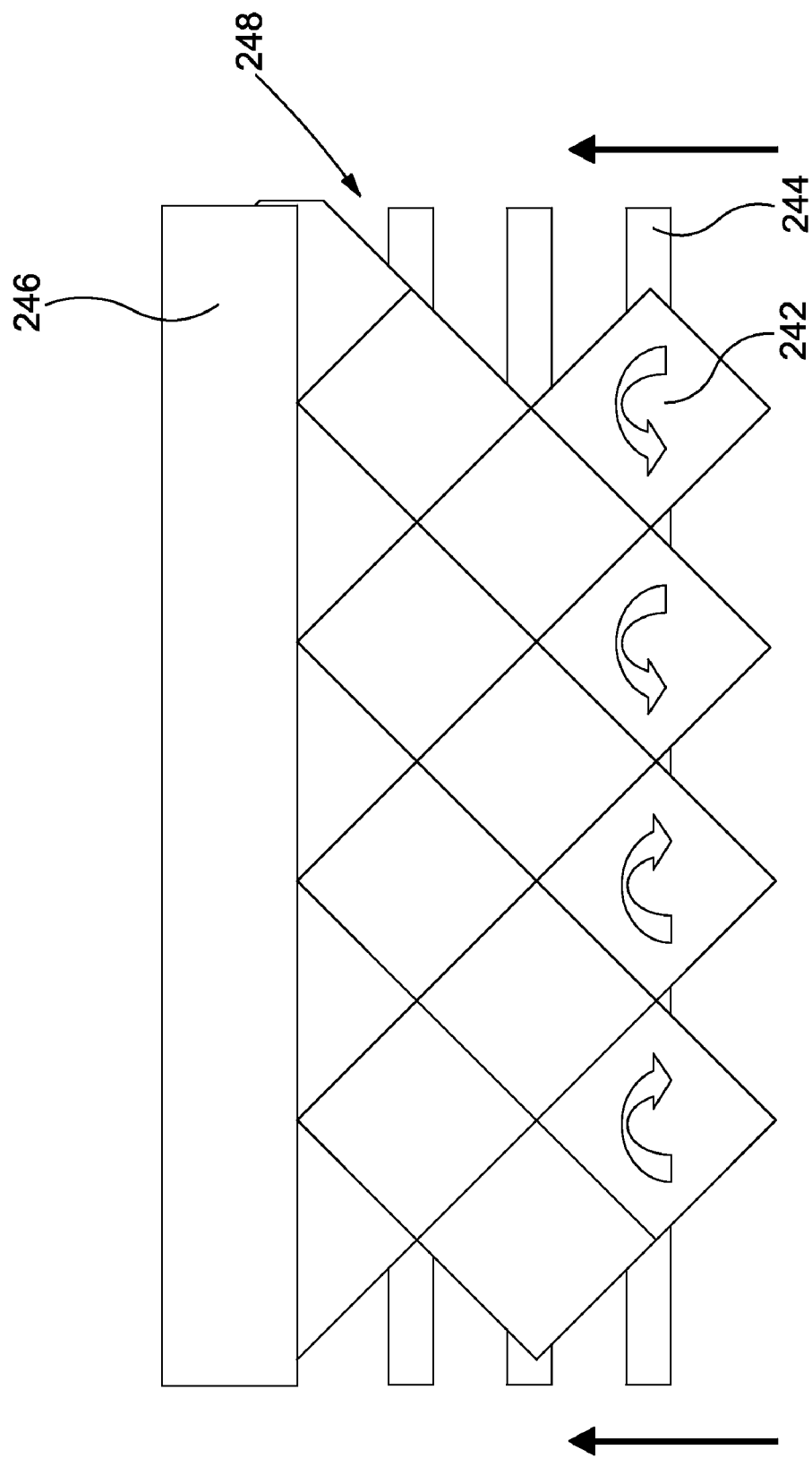

FIGS. 24a, 24b and 24c show the steps required in correcting misalignment of array elements relative to each other after they have been adjusted in the z plane so that, when closed, the array has no gaps within it.

As can be seen from FIG. 24a, a row 242 of pins includes a plurality of misaligned pins 244.

As is shown in FIG. 24b, a clamping element 246 in the form of a bolster segment is attached to the side 248 of the array remote from the row 242 including misaligned elements 244 thus providing a datum reference surface and then moving each row in turn, using the side actions against the datum to correct misalignment of the elements, as is shown in FIG. 24c. The action of bringing the loose elements into contact with the fixed datum surface is sufficient to realign them thus removing any gaps between the elements during clamping of the array with the clamping means. If a single iteration is insufficient then a series of iterations, with an over shoot to ensure contact and/or bringing the row progressively closer to the datum, may be utilised. This process may be further improved by increasing the frequency of the motion such that it becomes a reciprocating oscillation. Where the misalignment is small, it is possible to move a number of rows at the same time and apply an external vibration source to help spin the elements thereby saving time.

In alternative embodiment, the datum reference may be provided by manually aligning the array elements to provide a datum reference and moving the misaligned elements manually.

The invention claimed is:

1. A tooling system comprising:
   a plurality of elongate elements each having an upper surface, said elements being arranged in an array to present said upper surfaces for machining by cutting tool means;
   support means for supporting said elements, each said element being supported on said support means for axial movement between upper and lower positions relative to the other elements in the array thereby to enable adjustment of the vertical position of said element surface;
   and clamping means for clamping the array of elements in a closed position in which the elements contact one another for enabling the free ends of the elements to be machined to produce a desired surface contour and further comprising means for storing existing data representing the contour of the surface of each element including the z values of the surface at any given x, y coordinate point relative to a datum; storing new data representing a desired contour for the surface of each element position in the array including the z values of the surface at said any given x, y coordinate point relative to said datum; comparing said new data for a first, selected element position; and adjusting the height of said first element to adjust said z values of said existing data at said any given x, y coordinate point to values at least equal to said z values of said new data at said any given x, y coordinate.

2. A tooling system as claimed in claim 1 further comprising:
   drive means for moving the elements of the array between said closed position in which the elements contact one another, and an open position in which at least one selected element is spaced from adjacent elements for enabling axial adjustment of said selected element;
   and adjustment means for adjusting the axial position of each element such that the upper surfaces of the elements define approximately said desired surface contour.

3. A tooling system as claimed in claim 1 wherein:
   said support means comprises a plurality of supporting rails arranged parallel with one another;
   each said support rail supports a plurality of elements;
   and said support rails are movable laterally relative to one another.

4. A tooling system as claimed in claim 3 wherein said drive means includes means for gripping said support rail.

5. A tooling system as claimed in claim 4 wherein each said rail has locating means at each end thereof engageable by said gripping means.

6. A tooling system as claimed in claim 2 wherein said adjustment means comprises means for engaging and holding an element thereby to enable adjustment of the element position by said adjustment means.

7. A tooling system as claimed in claim 2 wherein said adjustment means comprises a fork having a head portion, and a plurality of spaced tines depending from the head portion for engaging an element, the tines defining an adjustment area corresponding to the area of an element of the array.

8. A tooling system as claimed in claim 7 wherein the fork comprises a substantially square head portion and a respective tine depending from each corner of said head portion, the tines defining an adjustment area corresponding to the area of an element of the array.

9. A tooling system as claimed in claim 7 wherein the position of the tines is adjustable relative to one another to accommodate a plurality of differently sized elements.

10. A tooling system as claimed in claim 7 wherein each tine comprises:
    a first section adjacent to the head portion and having an inwardly facing surface which together with the inwardly facing surfaces of the other tines defines an adjustment area;
    and a second section remote from the head portion and having an inwardly facing guide surface.

11. A tooling system as claimed in claim 10 wherein the inwardly facing guide surface of the second section of the tine is convex.

12. A tooling system as claimed in claim 10 wherein said first section of each tine is substantially triangular in cross-section, leading to said second section, the inwardly facing surface of which tapers towards the free end of the tine.

13. A tooling system as claimed in claim 12 wherein the square head portion is adjustable in size, so that the tines can be moved relative to one another to define a plurality of differently sized adjustment areas, corresponding to differently sized elements.

14. A tooling system as claimed in claim 2 further comprising:
    a tool holder for receiving said cutting tool means, said tool holder being supported for movement in orthogonal x, y, z directions wherein x and y represent orthogonal axes in a horizontal plane and z represents the vertical axis;
    and drive means for moving said tool holder in said orthogonal directions.

15. A tooling system as claimed in claim 1 wherein:
    each said element has a plurality of sides arranged such that in said closed position of said array each side abuts a side of an adjacent element;
    said elements are supported on said support means in rows;
    said support means is adjustable to enable a selected element to be spaced from adjacent elements thereby to enable said axial adjustment of the selected element.

16. A tooling system as claimed in claim 15 wherein:
each said element is substantially square in cross section;
said elements are formed in a diamond array and are supported on said support means in rows in which the elements of a row are aligned along a diagonal of each element;
said support means is arranged to enable each row of elements to be moved laterally relative to each adjacent row;
and each element is supported on said support means for rotation about its longitudinal axis thereby to enable said axial adjustment of the element.

17. A tooling system as claimed in claim 1 in which the elements are constructed from an upper portion, and a lower portion, the upper portion being removable and machinable.

18. A tooling system as claimed in claim 1 in which in a closed position said array presents a continuous upper surface.

19. A tooling system as claimed in claim 1 wherein each said element is supported on said support means such that the height of said element is adjustable in a screw threaded manner.

20. A tooling system as claimed in claim 19 wherein each said element is supported on said support means by a screw threaded axial rod engaged in a screw threaded bore in said support means.

21. A tooling system as claimed in claim 1 wherein said clamping means has an element contacting face which is adapted selectively to apply localised pressure to one or more elements of the array.

22. A tooling system according to claim 21 wherein the elements of the array are substantially polygonal in cross section.

23. A tooling system as claimed in claim 22 wherein the array is substantially triangular, rectangular or pentagonal in plan view and clamping means are provided on at least two adjacent sides of the array.

24. A tooling system as claimed in claim 22 wherein the elements of the array are arranged so that, in the closed position of the array, the major axes of adjacent elements are aligned and their vertices touch one another, so that the elements of the array tessellate.

25. A tooling system as claimed in claim 23 wherein said array is substantially rectangular in plan view and clamping means are provided on at least two adjacent sides of the rectangular array.

26. A tooling system as claimed in claim 25 wherein clamping means are provided on all four sides of the rectangular array.

27. A tooling system as claimed in claim 25 wherein the outer edges of the rectangular array are serrated and the clamping means has a correspondingly serrated face.

28. A tooling system as claimed in claim 1 wherein the lace of the clamping means contacting the array is formed from a plurality of teeth, at least some of which teeth are adjustable in order selectively to apply localised pressure to one or more elements of the array, in line with the sides of the elements.

29. A tooling system as claimed in claim 28 wherein the teeth are also individually adjustable in height relative to one another.

30. A tooling system as claimed in claim 1 wherein the clamping means comprise two sets of clamps, the first of which is used during machining of the elements of the tooling system and the second of which is used when the elements of the array have been machined and the system is being used as a mould.

31. A tooling system as claimed in claim 1 wherein the clamping means are modular in design, so that individual clamping sides interlock with one another to form larger units.

32. A tooling system as claimed in claim 1 further comprising means for securing the clamping means in position around the array of elements.

33. A tooling system as claimed in claim 1 wherein said clamping means are adjustable in height relative to the height of said elements.

34. A method of tooling using a tooling system as claimed in claim 1 comprising:
storing existing data representing the contour of the surface of each element including the z values of the surface at any given x, y coordinate point relative to a datum;
storing new data representing a desired contour for the surface of each element position in the array including the z values of the surface at said any given x, y coordinate point relative to said datum;
comparing said new data for a first, selected element position with the existing data for a first element in said selected element position;
and adjusting the height of said first element to adjust said z values of said existing data at said any given x, y coordinate point to values at least equal to said z values of said new data at said any given x, y coordinate point.

35. A method as claimed in claim 34 further comprising repeating the steps of comparing said data and adjusting the height of the element for each element position and element in said array.

36. A method as claimed in claim 34 wherein said data includes the gradient and rate of change of curvature of the surface.

37. A method as claimed in claim 34 further comprising providing a preselected height adjustment offset for said elements in said array.

38. A method as claimed in claim 34 further comprising:
supporting said elements for axial movement between upper and lower positions relative to the other elements in the array thereby to enable adjustment of the vertical position of said element surface;
and clamping the array of elements in a closed position in which the elements contact one another for enabling the free ends of the elements to be machined to produce said desired surface contour.

39. A method as claimed in claim 38 further comprising moving the elements of the array between said closed position in which the elements contact one another, and an open position in which at least one selected element is spaced from adjacent elements for enabling axial adjustment of said selected element;
gripping said support rail by engaging said gripping means with said locating means
and adjusting the axial position of each element such that the upper surfaces of the elements define approximately said desired surface contour.

40. A method as claimed in claim 34 further comprising engaging and holding an element thereby to enable adjustment of the element position.

41. A method as claimed in claim 39 wherein each said element has a plurality of sides arranged such that in said closed position of said array each side abuts a side of an adjacent element;
and the step of adjusting the height of a selected element comprises adjusting the position of adjacent elements to space said adjacent elements laterally from said selected element thereby to allow movement of said selected element.

42. A method as claimed in claim 41 wherein said elements are arranged in rows in said array and the step of adjusting the height of a selected element includes laterally separating the row containing the selected element from the next adjacent rows.

43. A method as claimed in claim 42 wherein the step of laterally separating the row containing the selected element from the next adjacent rows comprises:
   determining the position of the row within the rows in the array;
   and where the number of rows to be moved exceeds a preset value, moving a smaller number of rows in turn until said selected row is moved.

44. A method as claimed in claim 42 wherein each said element is shaped in cross section such that rotation of an element relative to adjacent elements in a row spaces said element from said adjacent elements.

45. A method as claimed in claim 44 wherein spacing each said element from an adjacent element in a row comprises rotating each said element through a preselected angle.

46. A method as claimed in claim 45 wherein said preselected angle is 45 degrees.

47. A method as claimed in claim 34 wherein each said element is rotatably supported and the height of said element is adjusted by rotation of said element.

48. A method as claimed in claim 47 wherein the step of adjusting the height of said element comprises comparing said existing data for the element with new data for the element position and rotating said element through a preselected angle to rotate the surface of the element into a position where the existing data approximates closest to said new data.

49. A method as claimed in claim 48 wherein said preselected angle is one of 90°, 270° and 180°.

50. A method as claimed in claim 34 wherein:
   each said element is substantially square in cross section;
   and said elements are formed in a diamond array and are supported in rows in which the elements of a row are aligned along a diagonal of each element.

51. A method as claimed in claim 34 further comprising storing further data representing the new surface contour of the adjusted elements prior to machining.

52. A method as claimed in claim 51 further comprising machining the surface of the elements of the array after adjustment in dependence on the difference between the desired surface contour and the actual surface contour.

53. A method as claimed in claim 52 further comprising comparing the amount of material to be machined from an element with a reference value and replacing said element with a plurality of smaller elements in dependence thereon;
   and adjusting the height of each said smaller element to adjust z values of existing data for said smaller elements to values at least equal to z values of said new data for said smaller element positions.

54. A method of tooling using a tooling system as claimed in claim 1 comprising:
   storing existing data representing the existing contour of the surface of each element of at least one existing array including the z values of the surface at any given x, y coordinate point relative to a datum;
   storing new data representing a desired contour for the surface of each element position in a new array including the z values of the surface at said any given x, y coordinate point relative to said datum;
   comparing said new data for a first, selected element position with the existing data for at least a first element in the or each said existing array;
   and in dependence on said comparison:
   (i) where the existing surface of one of said existing arrays approximates closest to said desired surface, selecting said existing array for machining and adjusting the height of each element of said existing array to adjust said z values of said existing data to values at least equal to said z values of said new data;
   (ii) where the existing contour of the surface of an existing element of at least one existing array approximates closest to said desired surface, selecting said existing element and moving said existing element to said selected element position in said new array for machining, and adjusting the height of said existing element to adjust said z values of said existing data to values at least equal to said z values of said new data;
   (iii) where the existing surface of an existing element at said first, selected element position approximates closest to said desired surface, adjusting the height of said existing element to adjust said z values of said existing data to values at least equal to said z values of said new data.

55. A method as claimed in claim 34 further comprising the step of aligning the elements within the array relative to each other after they have been adjusted in the z plane so that, when closed, the array has no gaps within it.

56. A method as claimed in claim 55 in which the elements are aligned automatically.

* * * * *